US010856347B2

(12) United States Patent
Liu et al.

(10) Patent No.: US 10,856,347 B2
(45) Date of Patent: Dec. 1, 2020

(54) WIRELESS COMMUNICATIONS METHOD, APPARATUS, DEVICE, AND STORAGE MEDIUM

(71) Applicant: ADVANCED NEW TECHNOLOGIES CO., LTD., Grand Cayman (KY)

(72) Inventors: Xiao Liu, Hangzhou (CN); Shengbo Zhao, Hangzhou (CN); Qi Huang, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/879,496

(22) Filed: May 20, 2020

(65) Prior Publication Data

US 2020/0288520 A1     Sep. 10, 2020

Related U.S. Application Data

(63) Continuation of application No. PCT/CN2020/071120, filed on Jan. 9, 2020.

(30) Foreign Application Priority Data

Jun. 28, 2019     (CN) .......................... 2019 1 0572992

(51) Int. Cl.
*H04W 76/14* (2018.01)
*H04W 76/30* (2018.01)
*H04W 8/00* (2009.01)

(52) U.S. Cl.
CPC .......... *H04W 76/14* (2018.02); *H04W 8/005* (2013.01); *H04W 76/30* (2018.02)

(58) Field of Classification Search
CPC ...... H04W 76/14; H04W 76/30; H04W 8/005
(Continued)

(56) References Cited

U.S. PATENT DOCUMENTS 6,327,613 B1    12/2001   Goshey et al.
7,688,461 B2     3/2010   Wise
(Continued)

FOREIGN PATENT DOCUMENTS

CN    104540190 A    4/2015
CN    105517110 A    4/2016
(Continued)

OTHER PUBLICATIONS

First Search for Chinese Application No. 201910572992.8 dated May 11, 2020.
(Continued)

*Primary Examiner* — MD K Talukder (57) ABSTRACT

A wireless communications method includes: obtaining a first wireless universal model corresponding to a target device, wherein the first wireless universal model comprises a scanning rule applicable to wireless devices, and the scanning rule comprises identification information of the target device; scanning peripheral devices, and determining identification information of a scanned peripheral device based on the scanning rule; determining whether the identification information of the target device matches the identification information of the scanned peripheral device; and in response to that the identification information of the target device matches the identification information of the scanned peripheral device, pairing the scanned peripheral device with the primary device, to establish a communication connection between the scanned peripheral device and the primary device.

12 Claims, 5 Drawing Sheets

(58) Field of Classification Search
USPC ..................................... 455/41.1, 41.2, 41.3
See application file for complete search history.

(56) References Cited

U.S. PATENT DOCUMENTS

| | | | |
|---|---|---|---|
| 8,316,237 | B1 | 11/2012 | Felsher et al. |
| 8,571,598 | B2 | 10/2013 | Valavi |
| 8,768,251 | B2 * | 7/2014 | Claus ................. H04W 12/003 |
| | | | 455/41.2 |
| 8,868,803 | B2 | 10/2014 | Caballero |
| 9,047,420 | B2 | 6/2015 | Caballero |
| 9,258,719 | B2 | 2/2016 | Tarraf et al. |
| 9,699,593 | B2 | 7/2017 | Viswanadham et al. |
| 9,727,291 | B1 | 8/2017 | Skinner |
| 10,271,359 | B2 | 4/2019 | Arnoldus et al. |
| 10,491,575 | B2 | 11/2019 | Verzun et al. |
| 2007/0249286 | A1 * | 10/2007 | Ma .......................... H04L 63/08 |
| | | | 455/41.3 |
| 2013/0130622 | A1 * | 5/2013 | Yang ....................... H04W 4/21 |
| | | | 455/41.2 |
| 2014/0342670 | A1 * | 11/2014 | Kang .................. H04M 1/7253 |
| | | | 455/41.2 |
| 2014/0355582 | A1 | 12/2014 | Kamath et al. |
| 2015/0195853 | A1 | 7/2015 | Vleugels et al. |
| 2015/0372746 | A1 * | 12/2015 | Xie ...................... H04L 1/1829 |
| | | | 455/11.1 |
| 2016/0157078 | A1 * | 6/2016 | Palin ....................... H04W 4/80 |
| | | | 455/41.2 |
| 2016/0174025 | A1 * | 6/2016 | Chaudhri .............. H04W 4/021 |
| | | | 455/41.1 |
| 2016/0366708 | A1 * | 12/2016 | Yeom ..................... H04W 4/80 |
| 2016/0374133 | A1 | 12/2016 | Logue et al. |
| 2017/0164413 | A1 * | 6/2017 | Bernsen .................. H04W 4/80 |
| 2018/0317826 | A1 * | 11/2018 | Muhsin .................. G16H 40/40 |
| 2019/0124701 | A1 * | 4/2019 | McClellan ............. G16H 40/63 |
| 2020/0015153 | A1 | 1/2020 | Peng |
| 2020/0015300 | A1 | 1/2020 | Suumaki et al. |

FOREIGN PATENT DOCUMENTS

| | | |
|---|---|---|
| CN | 105652668 A | 6/2016 |
| CN | 106464688 B | 2/2017 |
| CN | 106658355 A | 5/2017 |
| CN | 106878923 A | 6/2017 |
| CN | 109862549 A | 6/2019 |
| EP | 2749214 B1 | 7/2014 |
| KR | 20200005744 A | 1/2020 |

OTHER PUBLICATIONS

Supplementary Search for Chinese Application No. 201910572992.8 dated Jun. 17, 2020.

* cited by examiner

WIRELESS COMMUNICATIONS METHOD, APPARATUS, DEVICE, AND STORAGE MEDIUM

CROSS-REFERENCE TO RELATED APPLICATIONS

This application is a continuation application of International Patent Application No. PCT/CN2020/071120, filed on Jan. 9, 2020, which is based on and claims priority to and benefit of Chinese Patent Application No. 201910572992.8, filed with China National Intellectual Property Administration (CNIPA) of People's Republic of China on Jun. 28, 2019. The entire disclosures of all of the above-identified applications are incorporated herein by reference.

TECHNICAL FIELD

The specification relates to the field of communications technologies, and in particular, to a Bluetooth low energy (BLE) communications method, a BLE communications apparatus, a BLE communications device, and a computer-readable storage medium thereof.

BACKGROUND

As a short-range, low-cost, and interoperable wireless technology, the BLE technology is widely used in the field of the Internet of Things, and emerged with various types of BLE devices. How to communicate with different types of BLE devices becomes a focus of attention.

Currently, when BLE devices communicate with each other, a primary device scans surrounding peripheral devices. When a target peripheral device is found, the primary device establishes a communication connection to the target peripheral device, and then determines, according to an application scenario and device information, which services provided by the peripheral device will be used. However, in such a technical solution, BLE devices manufactured by different manufacturers differ greatly in the communication procedure and the communication data format. To adapt to the different types of BLE devices, the primary device needs to be configured with application programs corresponding to the various types of BLE devices. Otherwise, the differences of the BLE devices manufactured by different manufacturers may cause that a target peripheral device cannot be found or a communication connection cannot be established to a peripheral device.

SUMMARY

The embodiments of the specification provide a BLE communications method, a BLE communications apparatus, a BLE communications device, and a computer-readable storage medium thereof, to resolve problems in the existing technologies that a primary device needs to be configured with the application programs corresponding to various types of BLE devices. Otherwise, a target peripheral device cannot be found or a communication connection cannot be established to the target peripheral device.

To resolve the above technical problems, the embodiments of the specification are implemented as follows.

According to a first aspect of the embodiment of the specification, a wireless communications method is provided. and applied to a primary device. The method may comprise: obtaining a first wireless universal model corresponding to a target device, wherein the first wireless universal model comprises a scanning rule applicable to wireless devices, and the scanning rule comprises identification information of the target device; scanning peripheral devices, and determining identification information of a scanned peripheral device based on the scanning rule; determining whether the identification information of the target device matches the identification information of the scanned peripheral device; and in response to that the identification information of the target device matches the identification information of the scanned peripheral device, pairing the scanned peripheral device with the primary device, to establish a communication connection between the scanned peripheral device and the primary device.

In some embodiments of the specification, based on the foregoing solution, the first wireless universal model comprises one or more of a reading rule, a writing rule, or a monitoring rule that is applicable to the wireless devices, and the reading rule, the writing rule, or the monitoring rule comprises a service identifier of at least one target service.

In some embodiments of the specification, based on the foregoing solution, the communications method may further includes: in response to that a target operation is performed on the peripheral device, obtaining at least one service of the peripheral device, wherein the target operation comprises one of a reading operation, a writing operation, or a monitoring operation; determining a service identifier of the obtained at least one service; determining whether the service identifier of the obtained at least one service is the same as the service identifier of the at least one target service; and in response to that the service identifier of the obtained at least one service is the same as the service identifier of the at least one target service, determining that the obtained at least one service is the at least one target service corresponding to the target operation.

In some embodiments of the specification, based on the foregoing solution, the reading rule, the writing rule, or the monitoring rule may comprise a characteristic identifier of at least one target characteristic corresponding to the target service. The communications method may further include: determining a characteristic identifier of at least one characteristic corresponding to the obtained at least one service; determining whether the characteristic identifier of the at least one characteristic is the same as the characteristic identifier of the at least one target characteristic; and in response to that the characteristic identifier of the at least one characteristic is the same as the characteristic identifier of the at least one target characteristic, determining that the at least one characteristic is the at least one target characteristic corresponding to the target service.

In some embodiments of the specification, based on the foregoing solution, the target operation is a reading operation. The communications method may further include: reading an attribute value of the target characteristic corresponding to the reading operation; and uploading the read attribute value of the target characteristic to a server.

In some embodiments of the specification, based on the foregoing solution, the target operation is a writing operation. The writing rule may further include command data to be written to the peripheral device. The communications method may further include: writing the command data comprised in the writing rule to an attribute value of a target characteristic corresponding to the writing operation.

In some embodiments of the specification, based on the foregoing solution, the target operation is a monitoring operation. The monitoring rule comprises a response data collection field and a response data count field. The communications method may further include: monitoring an attribute value of a target characteristic corresponding to the monitoring operation; in response to that the attribute value of the target characteristic corresponding to the monitoring operation changes, returning response data corresponding to the target operation to the primary device; collecting the response data corresponding to the target operation through the response data collection field, wherein the response data corresponding to the target operation comprises operation success data or operation failure data; and counting the response data corresponding to the target operation through the response data count field.

In some embodiments of the specification, based on the foregoing solution, the communications method may further include: obtaining a second wireless model based on the response data corresponding to the target operation after the target operation ends; determining whether the second wireless model comprises one of the scanning rule, the reading rule, the writing rule, or the monitoring rule; and in response to that the second wireless model does not comprise one of the scanning rule, the reading rule, the writing rule, or the monitoring rule, disconnecting the communication connection between the peripheral device and the primary device.

According to a second aspect of the embodiment of the specification, a wireless communications device is provided The wireless communications device may include: a processor and a memory configured to store computer executable instructions, the computer executable instructions, when executed, causing the processor to perform operations. The operations may include: obtaining a first wireless universal model corresponding to a target device, wherein the first wireless universal model comprises a scanning rule applicable to wireless devices, and the scanning rule comprises identification information of the target device; scanning peripheral devices, and determining identification information of a scanned peripheral device based on the scanning rule; determining whether the identification information of the target device matches the identification information of the scanned peripheral device; and in response to that the identification information of the target device matches the identification information of the scanned peripheral device, pairing the scanned peripheral device with the primary device, to establish a communication connection between the scanned peripheral device and the primary device.

According to a third aspect of the embodiment of the specification, a non-transitory computer-readable storage medium is provided. The non-transitory computer-readable storage medium is configured to store computer executable instructions, when executed by a processor, the computer executable instructions to cause the processor to perform operations. The operations may include: obtaining a first wireless universal model corresponding to a target device, wherein the first wireless universal model comprises a scanning rule applicable to wireless devices, and the scanning rule comprises identification information of the target device; scanning peripheral devices, and determining identification information of a scanned peripheral device based on the scanning rule; determining whether the identification information of the target device matches the identification information of the scanned peripheral device; and in response to that the identification information of the target device matches the identification information of the scanned peripheral device, pairing the scanned peripheral device with the primary device, to establish a communication connection between the scanned peripheral device and the primary device.

Through the technical solutions in the embodiments of the specification, at one aspect, a first BLE universal model corresponding to a target device is obtained. Because a BLE universal model is a universal communications model for various different types of BLE devices, the BLE universal model is capable of adapting to various application scenarios and various BLE devices, and an application program corresponding to various types of BLE devices does not need to be configured at a primary device. At another aspect, identification information of a scanned peripheral device is determined based on a universal scanning rule included in the BLE universal model. Thus, the identification information of different types of peripheral devices can be obtained, for avoiding a problem that a target peripheral device cannot be found. At a further aspect, when identification information of the target device matches the identification information of the peripheral device, the peripheral device is paired with the target device. Various types of communication connections between the peripheral device and the primary device can be established, for avoiding a problem that a communication connection cannot be established to a target peripheral device.

BRIEF DESCRIPTION OF THE DRAWINGS

To describe the technical solutions in the embodiments of the specification or in the existing technologies more clearly, the accompanying drawings required for describing the embodiments or the existing technologies are briefly introduced in the following. Apparently, the accompanying drawings in the following description show merely some embodiments of the specification, and a person of ordinary skill in the art may still derive other drawings from these accompanying drawings without creative efforts.

DETAILED DESCRIPTION

To enable a person skilled in the art to better understand the technical solutions of the specification, the technical solutions in the embodiments of the specification will be clearly and thoroughly described below with reference to the accompanying drawings of the embodiments of the specification. Apparently, the described embodiments are merely some rather than all of the embodiments of the specification. All other embodiments obtained by a person of ordinary skill in the art based on the embodiments of the specification without creative efforts shall fall within the protection scope of the specification.

Figure 1:
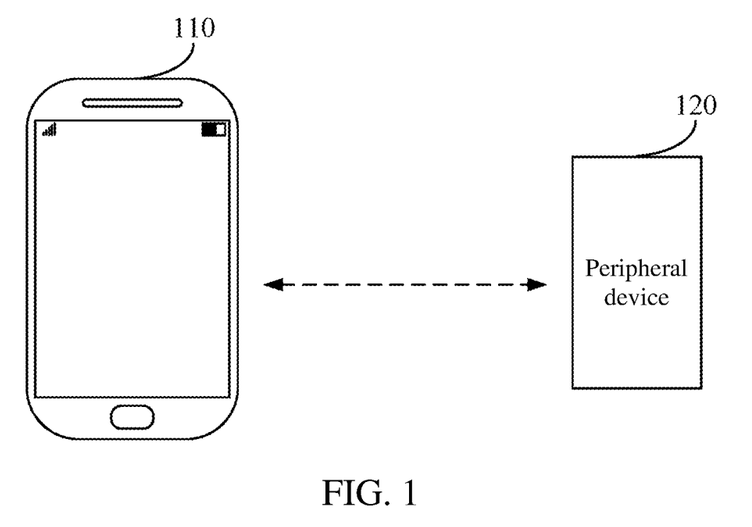
FIG. 1 is a schematic block diagram of an application scenario of a BLE communications method according to some embodiments of the specification.

FIG. 1 is a schematic block diagram of an application scenario of a BLE or wireless communications method according to some embodiments of the specification. Referring to FIG. 1, the application scenario comprises a primary device 110 and a peripheral device 120. Each of the primary device 110 and the peripheral device 120 includes a BLE Bluetooth module. The primary device 110 is a device initiating a connection in a BLE communication, and the peripheral device 120 is a device to be connected in the BLE communication. The primary device 110 scans surrounding peripheral devices. When the peripheral device 120 is scanned, the primary device 110 determines whether the peripheral device 120 is a to-be-connected target device based on a scanning rule, and establishes a communication connection to the peripheral device 120 if the peripheral device 120 is determined as the target device.

In the embodiment of FIG. 1, the primary device 110 may be a mobile phone, a tablet computer, a desktop computer, a portable laptop computer, or an on-board computer. The peripheral device 120 may be smart devices such as a smart door lock, a smart socket, a smart bulb, or a smart speaker, or may be smart devices having a BLE communications function such as a smart camera or a smart air conditioner, which is not particularly limited in the specification.

A BLE communications method according to an embodiment of the specification is described with reference to the application scenario in FIG. 1 and FIG. 2. It should be noted that, the foregoing application scenario is merely shown for ease of understanding of the spirit and principle of the specification, and the embodiments of the specification are not limited in this regard. Additionally, the embodiments of the specification may be applied to any suitable scenarios.

Figure 2:
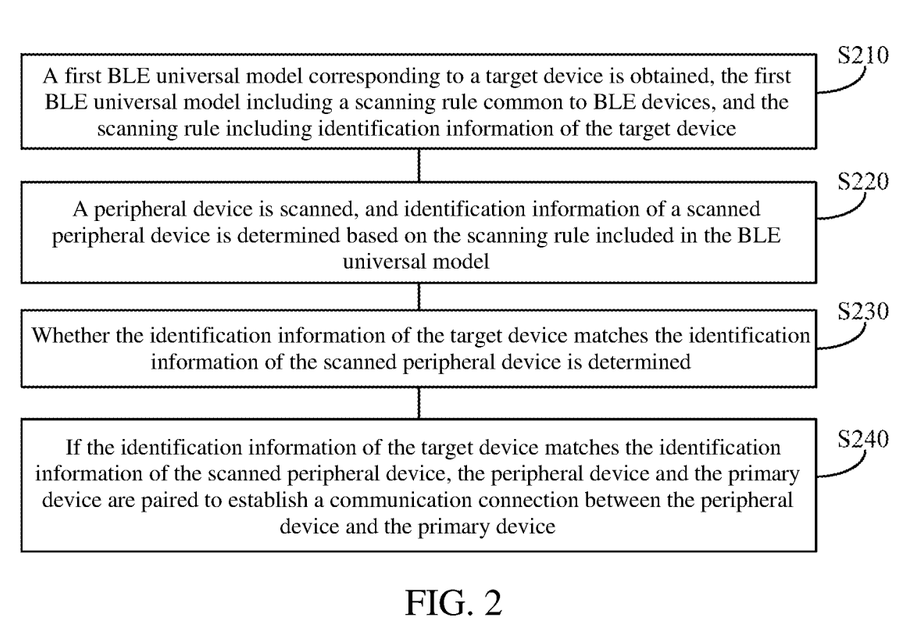
FIG. 2 is a flowchart of a BLE communications method according to some embodiments of the specification.

FIG. 2 is a flowchart of a BLE communications method according to some embodiments of the specification. The BLE communications method may include steps S210 to step S240, and may be applied to the primary device 110 in FIG. 1. The BLE communications method in the embodiment is described in detail with reference to FIG. 2 in the following.

In step S210, a first BLE universal model corresponding to a target device is obtained. The first BLE universal model includes a scanning rule common to BLE devices, and the scanning rule includes identification information of the target device.

A server such as a Cloud server may pre-store a BLE universal model for the BLE devices. The BLE universal model includes the scanning rule common to BLE devices. The scanning rule includes search rule information used for searching an identifier of the peripheral device from broadcast data. The search rule information may be path information of the identifier of the peripheral device in the broadcast data. For example, the broadcast data is a data structure of a type of a map and map data corresponding to a peripheral device XXX in the broadcast data is {data: {localName: XXX}}, the scanning rule includes a scan path field such as a scanPath field, and a value of the scanPath field is data/localName. The scan path field is a field for searching the broadcast data for identification information of the peripheral device.

In addition, the scanning rule may further include identification information value of the target device. The identification information of the target device corresponds to a target device to be found based on the search rule. The identification information of the target device may be a MAC address of the target device, or may be a name of the target device, or may be other appropriate identification information, which is not particularly limited in the specification. For example, the identification information of the target device is XXX, the scan path field scanPath is: data/localName, and the identification information value of the corresponding target device XXX is XXX, that is, the scanning rule includes the following information: {scanPath: data/localName, value: XXX}.

For example, the primary device is a mobile phone and the target device is a smart door lock. When the mobile phone is to establish a communication connection to the smart door lock, the mobile phone obtains a BLE universal model corresponding to the smart door lock from the server, and the BLE universal model includes the scanning rule common to BLE devices. For example, the scanning rule includes the following data: {scanPath: data/localName, value: ZKLock}, wherein the data/localName is the obtained path information of the identifier of the peripheral device in the broadcast data, and the value is identification information of the target device, such as the smart door lock.

The BLE universal model may be stored on the server, on the primary device, or on other appropriate devices, which is not particularly limited in the specification.

Further, the BLE universal model may further include one or more of a reading rule, a writing rule, or a monitoring rule that is common to BLE devices, and each of the reading rule, the writing rule, or the monitoring rule includes a service identifier of at least one target service. The service identifier is used for obtaining a corresponding service provided by the peripheral device. The service is a set of associated behaviors of particular functions or characteristics of the device, for example, a battery service, a heart rate service, etc.

In step S220, a peripheral device is scanned, and the identification information of the scanned peripheral device is determined based on the scanning rule included in the BLE universal model.

The peripheral device may be scanned to obtain the broadcast data of the scanned peripheral device. The identification information of the scanned peripheral device is determined from the broadcast data based on the scanning rule included in the BLE universal model. For example, the broadcast data is a data structure of a type of a map, the scanning rule includes a scan path field, such as a scanPath field, and the scan path field is a field for searching the identification information of the peripheral device in the broadcast data. For another example, the value of the scanPath field is data/localName, the map data of the peripheral device XXX in the broadcast data is {data: {localName: XXX} }. Through the scanPath field, a peripheral device of which the localName is XXX may be found in the map data {data: {localName: XXX}}.

In step S230, whether the identification information of the target device matches the identification information of the scanned peripheral device is determined.

The identification information of the target device is compared with the identification information of the scanned peripheral device. If the identification information of the target device is the same as the identification information of the scanned peripheral device, it is determined that the identification information of the target device matches the identification information of the scanned peripheral device. For example, the identification information of the target device is XXX, and the value of the scan path field, such as the scanPath field included in the scanning rule, is data/localName. If the broadcast data received by the primary device, such as a mobile phone, is {data: {localName: XXX} }, it is determined that the peripheral device sending the broadcast data is the target device to be connected, that is, the identification information of the target device matches the identification information of the scanned peripheral device.

In step S240, if the identification information of the target device matches the identification information of the scanned peripheral device, the peripheral device and the primary device are paired to establish a communication connection between the peripheral device and the primary device.

In an embodiment of the specification, if the identification information of the target device matches the identification information of the scanned peripheral device, a request for establishing the communication connection is initiated to the peripheral device. The peripheral device and the primary device are paired to establish the communication connection between the peripheral device and the primary device.

According to the BLE communications method in the embodiment in FIG. 2, at one aspect, a first BLE universal model corresponding to a target device is obtained. Because the BLE universal model is a universal communications model for various different types of BLE devices, the BLE universal model is capable of adapting to various application scenarios and various BLE devices, and the primary device does not need to be configured with various application programs corresponding to the various types of BLE devices. At another aspect, the identification information of the scanned peripheral device is determined based on a universal scanning rule included in the BLE universal model. The identification information of the different types of peripheral devices can be obtained for avoiding a problem that a target peripheral device cannot be found. At a further aspect, when the identification information of the target device matches the identification information of the peripheral device, the peripheral device is paired with the primary device. The various types of communication connections between the peripheral device and the primary device can be established for avoiding a problem that a communication connection cannot be established to a target peripheral device.

Further, after completing pairing for establishing the communication connection with the peripheral device, the primary device searches for a service in the peripheral device, and compares the service identifier of the service that has been found with the service identifiers in the reading, writing, and monitoring rules in the BLE universal model, respectively. If the service identifiers are the same, the found service is a corresponding target service of a reading service, a writing service, or a monitoring service. Then, a characteristic in the service can be conveniently searched for, and the characteristic identifier in the service is compared with the characteristic identifier of the target service. If the characteristic identifiers are the same, a corresponding target characteristic is obtained, such that the characteristic in the found service is the target characteristic.

In addition, an attribute value of the target characteristic corresponding to the monitoring operation may be monitored.

Corresponding response data or callback data is returned to the primary device if the attribute value of the target characteristic corresponding to the monitoring operation changes. The callback data may include data such as writing success, writing failure, reading success, or reading failure.

Further, the monitoring rule in the BLE universal model may further include a response data collection field and a response data count field. The communications method may further include: collecting response data corresponding to the target operation through the response data collection field, and the response data including operation success data or operation failure data; and counting the response data corresponding to the target operation through the response data count field.

Further, the communications method may further include obtaining a second BLE model based on the response data corresponding to the target operation after the target operation ends. For example, if the response data is writing data, the next target operation is still the writing operation, and the obtained second BLE model includes the writing rule.

In addition, the communications method may further include: determining whether the second BLE model includes one of the scanning rule, the reading rule, the writing rule, or the monitoring rule; and disconnecting the communication connection between the peripheral device and the primary device if none of the scanning rule, the reading rule, the writing rule, or the monitoring rule is included in the second BLE model. For example, if the obtained second BLE model does not include any of the scanning rule, the reading rule, the writing rule, or the monitoring rule, it is determined that communication is temporarily not required between the primary device and the peripheral device, and the communication connection between the peripheral device and the primary device is disconnected for reducing the energy consumption of the peripheral device.

Figure 3:
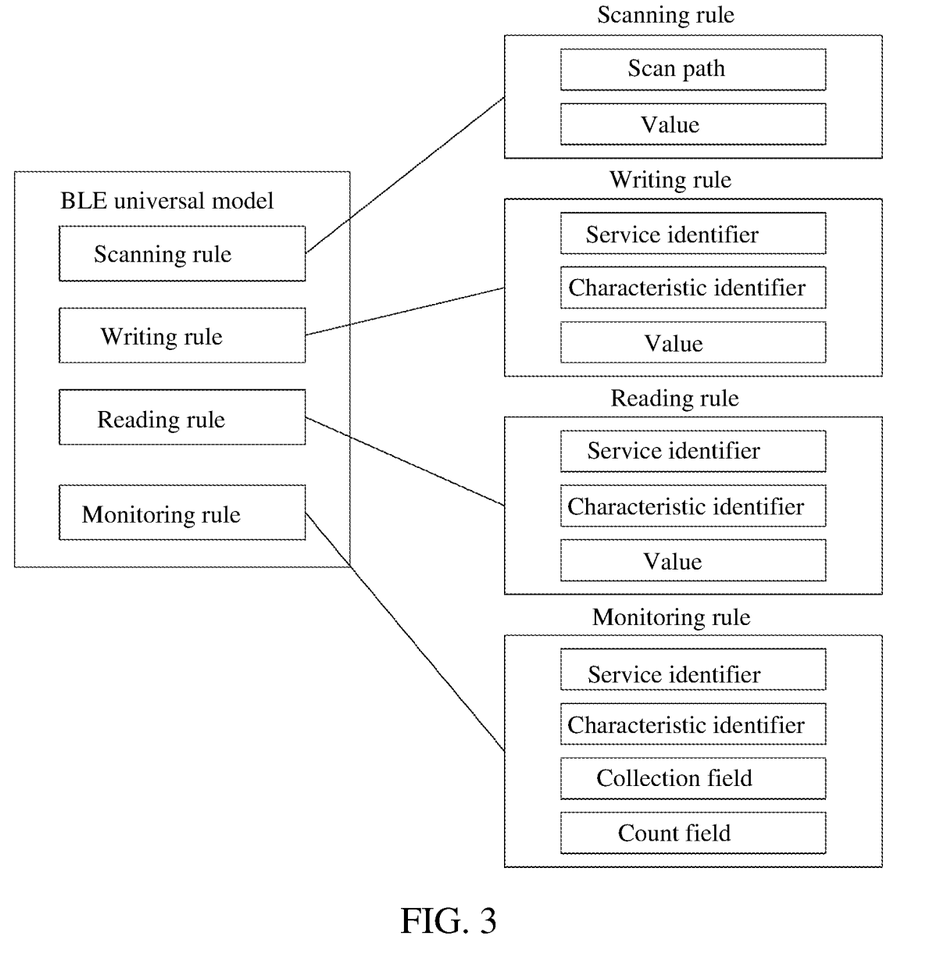
FIG. 3 is a schematic diagram of a BLE universal model according to some embodiments of the specification.

FIG. 3 is a schematic diagram of a BLE universal model, according to some embodiments of the specification.

Referring to FIG. 3, the BLE universal model may include one or more of the scanning rule, the writing rule, the reading rule, or the monitoring rule that are common to the BLE devices. The scanning rule includes the scan path field such as the scanPath, and the identification information of the target device such as the value. Each of the writing rule, the reading rule, and the monitoring rule includes the service identifier indicating a target service. The service identifier is used for obtaining the corresponding service provided by the peripheral device. The service is a set of associated behaviors of particular functions or characteristics of the device, for example, a battery service, a heart rate service, etc.

Further, the writing rule includes a service identifier serviceId and a characteristic identifier characteristicId of a to-be-written service. The service identifier is used as a basis for searching for the writing service provided by the BLE device. The characteristic identifier is used as a basis for searching for a writing characteristic included in the writing service of the BLE device. In addition, the writing rule may further include a command list field cmdlist. The command list field includes command data to be written to the corresponding characteristic of the service. After the command data is written to the corresponding characteristic, the peripheral device returns corresponding response information or callback information to the primary device. For example, when the peripheral device is a smart door lock and the writing service is a service for writing a digital key, the characteristic identifier is a characteristic identifier corresponding to the service for writing the digital key, that is, an identifier of the digital key. The command list includes data to be written to a characteristic corresponding to the identifier of the digital key, that is, the digital key. After the digital key is written to the characteristic corresponding to the smart door lock, a corresponding response message of writing success is returned to the primary device, such as a mobile phone.

Further, the reading rule includes a service identifier serviceId and a characteristic identifier characteristicId of a to-be-read service. The service identifier is used as a basis for searching for the reading service provided by the BLE device. The characteristic identifier is used as a basis for searching for a reading characteristic included in the reading service of the BLE device. The read value is used for storing read data. After the reading operation is ended, the read data may be reported to a Cloud server. For example, when the peripheral device is a smart door lock and the reading service is a service for reading a battery level of the smart door lock, the characteristic identifier is identification information corresponding to a battery level service, and a characteristic value corresponding to the characteristic identifier is the battery level. After the battery level is read from the smart door lock, the read battery level is reported to a Cloud server.

In addition, the monitoring rule includes a service identifier of a to-be-monitored target service and a corresponding characteristic identifier. The service identifier is used as a basis for searching for the monitoring service provided by the BLE device. The characteristic identifier is used as a basis for searching for a monitoring characteristic provided by the BLE device. The callback data returned after a command is written to the BLE device is obtained by monitoring a characteristic corresponding to the target service.

Further, the monitoring rule may further include the response data collection field and the response data count field. The response data collection field, such as a packagePrefix, is a header format of valid data in the data returned after that the characteristic value of the target service monitored by the monitoring service is changed. The response data count field, packageCount, is a quantity of pieces of the response data need to be collected. The response data is collected and processed through the response data collection field and the response data count field.

Figure 4:
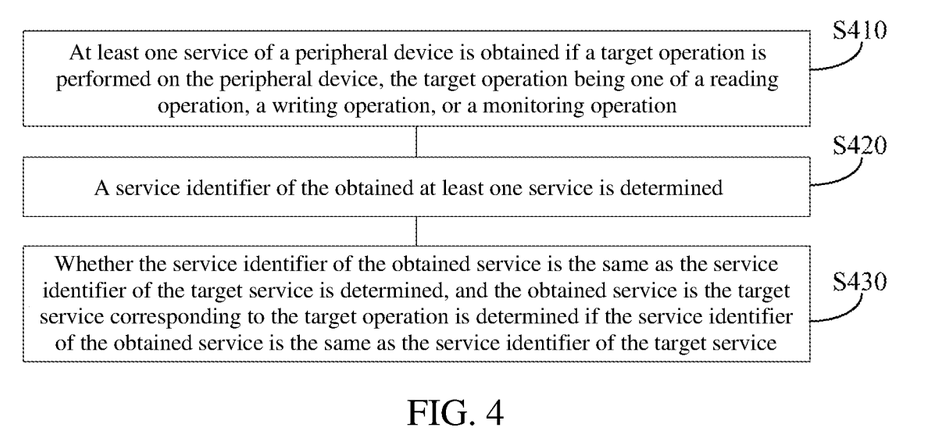
FIG. 4 is a flowchart for obtaining a target service according to some other embodiments of the specification.

FIG. 4 is a flowchart for obtaining a target service according to some other embodiments of the specification.

Referring to FIG. 4, in step S410, at least one service of a peripheral device is obtained if a target operation is performed on the peripheral device, wherein the target operation is one of a reading operation, a writing operation, or a monitoring operation.

After a communication connection is established between a primary device and the peripheral device based on a BLE universal model, if the target operation is performed on the peripheral device, for example, one of the reading operation, the writing operation, or the monitoring operation, a service provided by the peripheral device is searched for. For example, when the peripheral device is a smart door lock, the reading operation is performed on the smart door lock to read the battery level information of the smart door lock. Information of one or more services provided by the smart door lock is searched for. The plurality of services may include a service for reading a battery level, a service for writing a digital key, or may include other services such as a service for reading information of the smart door lock.

In step S420, a service identifier of the obtained at least one service is determined.

The service identifier of the corresponding service is extracted from the service information of the obtained at least one service of the peripheral device. The service identifier is a UUID unique identifier. The UUID unique identifier may be 16 bits, 32 bits, 128 bits, or the like. For example, when the peripheral device is a smart door lock, the service identifier of a battery level service provided by the smart door lock or the service identifier of the writing service for writing the digital key may be obtained.

Further, the BLE universal model may include one or more of the writing rule, the reading rule, and the monitoring rule that are common to BLE devices. Each of the writing rule, the reading rule, and the monitoring rule includes the service identifier indicating a target service. The service identifier is used for obtaining the corresponding service provided by the peripheral device. The service is a set of associated behaviors of particular functions or characteristics of the device, for example, a battery service, a heart rate service, etc.

In step S430, whether the service identifier of the obtained service is the same as the service identifier of the target service may be determined. It is determined that the obtained service is the target service corresponding to the target operation if the service identifier of the obtained service is the same as the service identifier of the target service.

The service identifier of the obtained service is compared with the service identifier of the target service including the writing rule, the reading rule, or the monitoring rule in the BLE universal model. If the service identifier of the obtained service is the same as the service identifier of the target service, it is determined that the obtained service identifier is the target service corresponding to the target operation. For example, if the target service is a service for reading a battery level of a smart door lock and the service identifier of the obtained service is for reading a battery level, the obtained service is the target service corresponding to the target operation.

Further, each of the reading rule, the writing rule, or the monitoring rule in the BLE universal model includes a characteristic identifier of at least one target characteristic corresponding to the target service. The characteristic is an attribute of the service, for example, the characteristic of the battery level service is a value of the battery level. After it is determined that the obtained service is the target service corresponding to the target operation, the characteristic identifier of the at least one characteristic corresponding to the obtained service is determined, and whether the characteristic identifier of a characteristic of the at least one characteristic is the same as the characteristic identifier of the target characteristic may be determined. If the characteristic identifier of a characteristic of the at least one characteristic is the same as the characteristic identifier of the target characteristic, it is determined that the characteristic is the target characteristic corresponding to the target operation.

Figure 5:
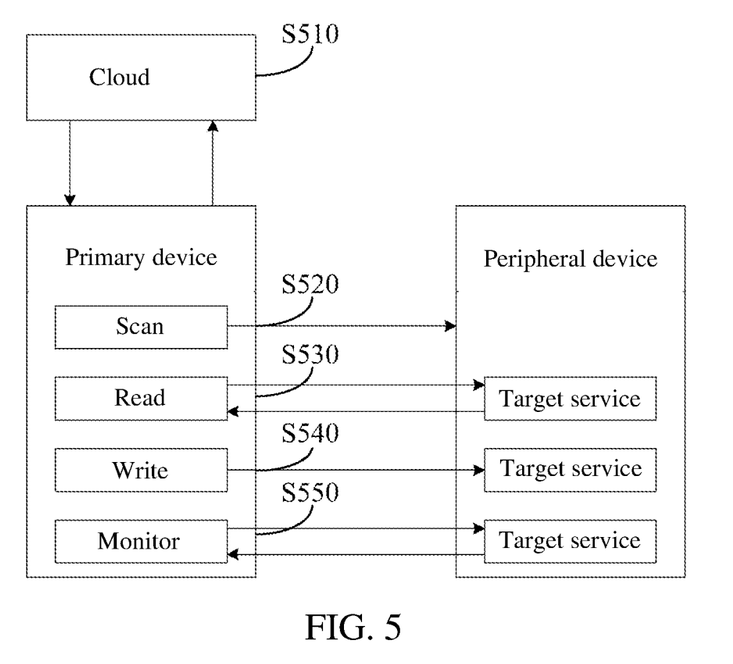
FIG. 5 is a schematic diagram of a BLE communications method according to some embodiments of the specification.

FIG. 5 is a schematic diagram of a BLE communications method according to some embodiments of the specification.

Referring to FIG. 5, in step S510, a BLE primary device requests to obtain a BLE universal model from a Cloud. The BLE universal model includes a scanning rule, a reading rule, a writing rule, or a monitoring rule that are common to BLE devices.

In step S520, the primary device scans a nearby BLE peripheral device, and receives broadcast data sent by the peripheral device. Identification information of the peripheral device in the received broadcast data is determined through a scan path field, such as a scanPath field, in the scanning rule in the BLE universal model issued by the Cloud. The identification information of the peripheral device in the broadcast data is a key-value pair, that is, key-value information. A value of the scanPath can determine the key-value of the identification information of a target device in the broadcast data. After the key-value of the identification information of the peripheral device in the broadcast data is determined, a value corresponding to the key-value in the broadcast data is compared with a value in the scanning rule. If the two values are the same, it is determined that the peripheral device is the target device. A request for establishing a connection is initiated to the peripheral device, and Bluetooth pairing is established to the peripheral device.

For example, assuming that the value of the scanPath field is data/localName, the map data of the peripheral device XXX in the broadcast data is {data: {localName: XXX} }. Through the scanPath field, a peripheral device of which localName is XXX may be found in the map data {data: {localName: XXX}}.

In step S530, after the Bluetooth pairing is established with the peripheral device, service information in the peripheral device is searched for, and a service identifier of the found service, such as a serviceId, is compared with a service identifier in the reading rule in the BLE model. If the service identifier of the found service is the same as the service identifier in the reading rule in the BLE model, the found service is a corresponding target reading service.

In step S540, the service identifier of the found service, such as the serviceId, is compared with a service identifier in the writing rule in the BLE model. If the service identifier of the found service is the same as the service identifier in the writing rule in the BLE model, the found service is a corresponding target writing service.

In step S550, the service identifier of the found service, such as the serviceId, is compared with a service identifier in the monitoring rule in the BLE model. If the service identifier of the found service is the same as the service identifier in the monitoring rule in the BLE model, the found service is a corresponding target monitoring service.

Figure 6:
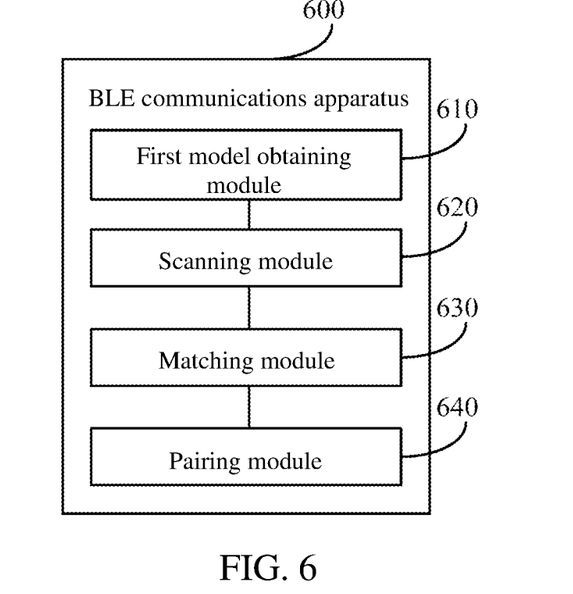
FIG. 6 is a schematic block diagram of a BLE communications apparatus according to some embodiments of the specification.

In an embodiment of the specification, a BLE communications apparatus is further provided. Referring to FIG. 6, a BLE communications apparatus 600 may be applied to a primary device, and the BLE communications apparatus 600 includes a first model obtaining module 610, a scanning module 620, a match module 630, and a pairing module 640. The first model obtaining module 610 is configured to obtain a first BLE universal model corresponding to a target device. The first BLE universal model includes a scanning rule common to BLE devices, and the scanning rule includes identification information of the target device. The scanning module 620 is configured to scan peripheral devices, and determine identification information of a scanned peripheral device based on the scanning rule. The match module 630 is configured to determine whether the identification information of the target device matches the identification information of the peripheral device. The pairing module 640 is configured to pair the peripheral device and the primary device, if the identification information of the target device matches the identification information of the peripheral device, to establish a communication connection between the peripheral device and the primary device.

Further, based on the foregoing description, the first BLE universal model further includes one or more of a reading rule, a writing rule, or a monitoring rule that is common to BLE devices, and each of the reading rule, the writing rule, or the monitoring rule includes a service identifier of at least one target service.

Figure 7:
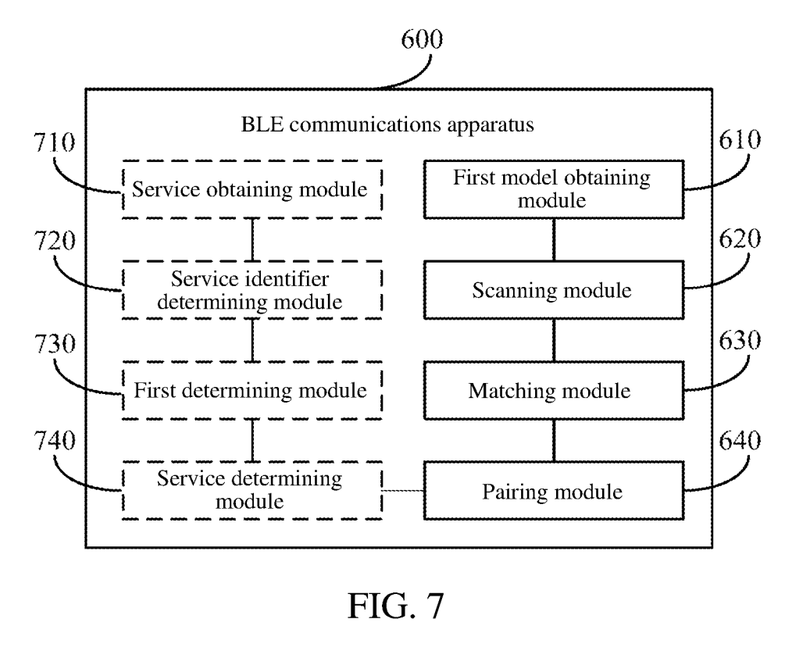
FIG. 7 is a schematic block diagram of a BLE communications apparatus according to some other embodiments of the specification.

Further, as shown in FIG. 7, based on the foregoing description, the communications apparatus 600 may further include: a service obtaining module 710, configured to obtain at least one service of the peripheral device if a target operation is performed on the peripheral device, and the target operation is one of a reading operation, a writing operation, or a monitoring operation; a service identifier determining module 720, configured to determine a service identifier of the obtained at least one service; a first determining module 730, configured to determine whether the service identifier of the obtained service is the same as the service identifier of the target service; and a service determining module 740, configured to determine that the obtained service is the target service corresponding to the target operation if the service identifier of the obtained service is the same as the service identifier of the target service.

Further, based on the foregoing description, each of the reading rule, the writing rule, or the monitoring rule includes a characteristic identifier of at least one target characteristic corresponding to the target service. The communications apparatus 600 further includes: a characteristic identifier determining module, configured to determine a characteristic identifier of the at least one characteristic corresponding to the obtained service; a second determining module, configured to determine whether the characteristic identifier of the characteristic is the same as the characteristic identifier of the target characteristic; and a target characteristic determining module, configured to determine that the characteristic is the target characteristic corresponding to the target operation if the characteristic identifier of the characteristic is the same as the characteristic identifier of the target characteristic.

Further, based on the foregoing description, when the target operation is a reading operation, the communications apparatus further includes: a reading module, configured to read an attribute value of the target characteristic corresponding to the reading operation; and an upload module, configured to upload the read attribute value of the target characteristic to a server.

Further, based on the foregoing description, when the target operation is a writing operation, the writing rule further includes command data to be written to the peripheral device. The communications apparatus further includes a writing module, configured to write the command data included in the writing rule to an attribute value of the target characteristic corresponding to the writing operation.

Further, based on the foregoing description, when the target operation is a monitoring operation, the communications apparatus further includes: a monitoring module, configured to monitor an attribute value of the target characteristic corresponding to the monitoring operation; and a returning module, configured to return corresponding response data to the primary device if the attribute value of the target characteristic corresponding to the monitoring operation changes.

Further, based on the foregoing description, the monitoring rule further includes a response data collection field and a response data count field. The communications apparatus further includes: a response collection module, configured to collect response data corresponding to the target operation through the response data collection field, and the response data including operation success data or operation failure data; and a count module, configured to count the response data corresponding to the target operation through the response data count field.

Further, based on the foregoing description, the communications apparatus further includes a second model obtaining module, configured to obtain a second BLE model based on the response data corresponding to the target operation after the target operation ends.

Further, based on the foregoing description, the communications apparatus further includes: a rule determining module, configured to determine whether the second BLE model includes one of the scanning rule, the reading rule, the writing rule, or the monitoring rule; and a disconnection module, configured to disconnect the communication connection between the peripheral device and the primary device if none of the scanning rule, the reading rule, the writing rule, or the monitoring rule is included in the second BLE model.

Further, based on the foregoing description, the first module obtaining module is configured to obtain the first BLE universal model corresponding to the target device from a Cloud.

According to the BLE communications apparatus in the embodiment in FIG. 6, at one hand, a first BLE universal model corresponding to a target device is obtained. Because a BLE universal model is a universal communications model for various different types of BLE devices, the BLE universal model is capable of adapting to various application scenarios and various BLE devices, and an application program corresponding to various types of BLE devices does not need to be configured at the end of a primary device. At another hand, identification information of a scanned peripheral device is determined based on a universal scanning rule included in the BLE universal model, for obtaining identification information of different types of peripheral devices, and avoiding a problem that a target peripheral device cannot be found. Further, when the identification information of the target device matches the identification information of the peripheral device, the peripheral device is paired with the target device, for establishing various types of communication connections between the peripheral device and the primary device, and avoiding a problem that a communication connection cannot be established to a target peripheral device.

The BLE communications apparatus provided by the embodiment of the specification can implement the processes in the foregoing method embodiments, and the same functions and effects are achieved, which is not described herein again.

Figure 8:
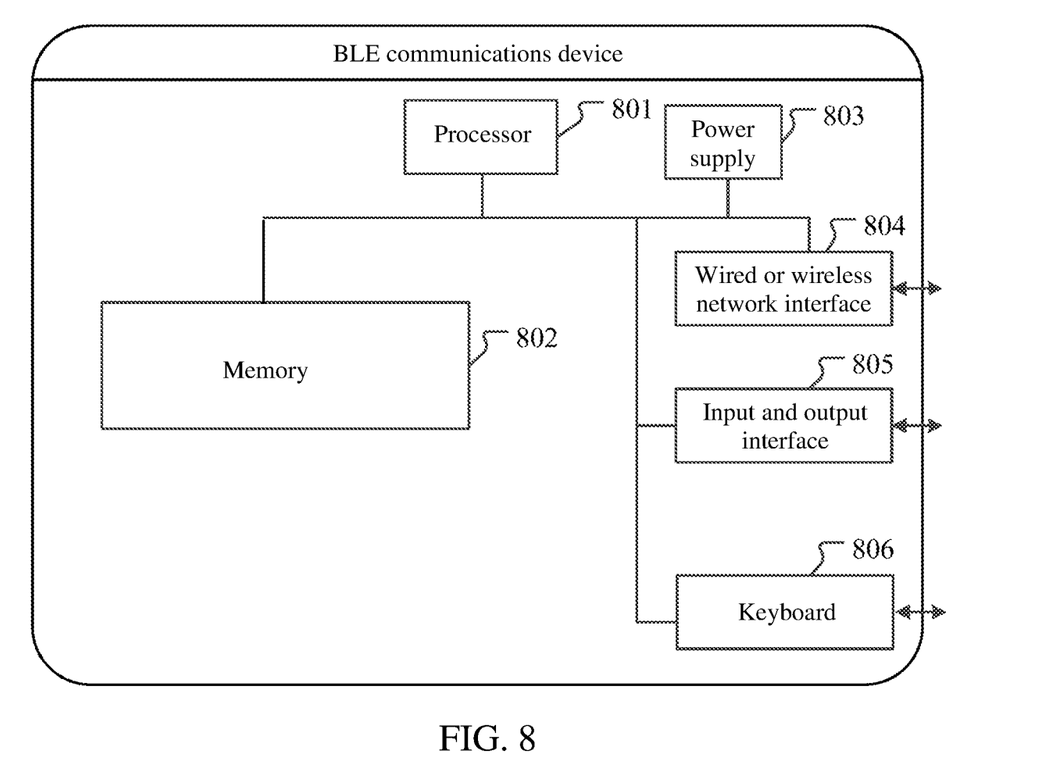
FIG. 8 is a schematic block diagram of a BLE communications device according to some embodiments of the specification.

Further, an embodiment of the specification further provides a BLE communications device, as shown in FIG. 8.

The BLE communications devices may differ a lot due to different configurations or different performances, and each device may include one or more processors 801 and a memory 802, and the memory 802 may store one or more application programs or data. The memory 802 may include a transient storage or a persistent storage. The application program stored in the memory 802 may include one or more modules (not shown in the figure), and each module may include a series of computer executable instructions for the BLE communications device. Further, the processor 801 may be configured to communicate with the memory 802, and execute, on the BLE communications device, the series of computer executable instructions in the memory 802. The BLE communications device may further include one or more power supplies 803, one or more wired or wireless network interfaces 804, one or more input and output interfaces 805, one or more keyboards 806, and the like.

In an embodiment of the specification, the BLE communications device may include a memory, and one or more programs. The one or more programs are stored in the memory, and the one or more programs may include one or more modules. Each module may include a series of computer executable instructions for the BLE communications device. The one or more processors are configured to execute the one or more programs including the computer executable instruction for performing the following operations: obtaining a first BLE universal model corresponding to a target device, the first BLE universal model including a scanning rule common to BLE devices, and the scanning rule including identification information of the target device; scanning peripheral devices, and determining identification information of a scanned peripheral device based on the scanning rule; determining whether the identification information of the target device matches the identification information of the peripheral device; and pairing the peripheral device and the primary device if the identification information of the target device matches the identification information of the peripheral device, to establish a communication connection between the peripheral device and the primary device.

The first BLE universal model may further include one or more of a reading rule, a writing rule, or a monitoring rule that is common to BLE devices, and each of the reading rule, the writing rule, or the monitoring rule includes a service identifier of at least one target service.

When the computer executable instruction is executed, the operations may further include: obtaining at least one service of the peripheral device if a target operation is performed on the peripheral device, the target operation being one of a reading operation, a writing operation, or a monitoring operation; determining a service identifier of the obtained at least one service; determining whether the service identifier of the obtained service is the same as the service identifier of the target service; and determining that the obtained service is the target service corresponding to the target operation if the service identifier of the obtained service is the same as the service identifier of the target service.

When the computer executable instruction is executed, each of the reading rule, the writing rule, or the monitoring rule includes a characteristic identifier of at least one target characteristic corresponding to the target service, and the operations may further include: determining a characteristic identifier of at least one characteristic corresponding to the obtained service; determining whether the characteristic identifier of the characteristic is the same as the characteristic identifier of the target characteristic; and determining that the characteristic is the target characteristic corresponding to the target operation if the characteristic identifier of the characteristic is the same as the characteristic identifier of the target characteristic.

When the computer executable instruction is executed and the target operation is a reading operation, the operations may further include: reading an attribute value of the target characteristic corresponding to the reading operation; and uploading the read attribute value of the target characteristic to a server.

When the computer executable instruction is executed and the target operation is a writing operation, the writing rule further includes command data to be written to the peripheral device, and the operations may further include writing the command data included in the writing rule to an attribute value of the target characteristic corresponding to the writing operation.

When the computer executable instruction is executed and the target operation is a monitoring operation, the operations may further include: monitoring an attribute value of the target characteristic corresponding to the monitoring operation; and returning corresponding response data to the primary device if the attribute value of the target characteristic corresponding to the monitoring operation changes.

When the computer executable instruction is executed, and the monitoring rule further includes a response data collection field and a response data count field, the operations may further include: collecting response data corresponding to the target operation through the response data collection field, the response data including operation success data or operation failure data; and counting the response data corresponding to the target operation through the response data count field.

Further, when the computer executable instruction is executed, the operations may further include obtaining a second BLE model based on the response data corresponding to the target operation after the target operation ends.

Further, when the computer executable instruction is executed, the operations may further include: determining whether the second BLE model includes one of the scanning rule, the reading rule, the writing rule, or the monitoring rule; and disconnecting the communication connection between the peripheral device and the primary device if none of the scanning rule, the reading rule, the writing rule, or the monitoring rule is included in the second BLE model.

When the computer executable instruction is executed, obtaining a first BLE universal model corresponding to a target device may include obtaining the first BLE universal model corresponding to the target device from a Cloud.

The BLE communications device provided by the embodiment of the specification can implement the processes in the foregoing method embodiments, and achieve the same functions and effects, which is not described herein again.

In addition, an embodiment of the specification further provides a storage medium, configured to store a computer executable instruction. The storage medium may be a USB flash drive, a compact disc, a hard disk, and the like. The computer executable instruction stored in the storage medium can be executed by a processor to implement the following processes: obtaining a first BLE universal model corresponding to a target device, the first BLE universal model including a scanning rule common to BLE devices, and the scanning rule including identification information of the target device; scanning peripheral devices, and determining identification information of a scanned peripheral device based on the scanning rule; determining whether the identification information of the target device matches the identification information of the peripheral device; and pairing the peripheral device and the primary device if the identification information of the target device matches the identification information of the peripheral device, to establish a communication connection between the peripheral device and the primary device.

The first BLE universal model may further include one or more of a reading rule, a writing rule, or a monitoring rule that is common to BLE devices, and each of the reading rule, the writing rule, or the monitoring rule includes a service identifier of at least one target service.

When the computer executable instruction stored in the storage medium is executed by the processor, the processes may further include: obtaining at least one service of the peripheral device if a target operation is performed on the peripheral device, the target operation being one of a reading operation, a writing operation, or a monitoring operation; determining a service identifier of the obtained at least one service; determining whether the service identifier of the obtained service is the same as the service identifier of the target service; and determining that the obtained service is the target service corresponding to the target operation if the service identifier of the obtained service is the same as the service identifier of the target service.

When the computer executable instruction stored in the storage medium is executed by the processor, each of the reading rule, the writing rule, or the monitoring rule includes a characteristic identifier of at least one target characteristic corresponding to the target service, and the processes may further include: determining a characteristic identifier of at least one characteristic corresponding to the obtained service; determining whether the characteristic identifier of the characteristic is the same as the characteristic identifier of the target characteristic; and determining that the characteristic is the target characteristic corresponding to the target operation if the characteristic identifier of the characteristic is the same as the characteristic identifier of the target characteristic.

When the computer executable instruction stored in the storage medium is executed by the processor and the target operation is a reading operation, the processes may further include: reading an attribute value of the target characteristic corresponding to the reading operation; and uploading the read attribute value of the target characteristic to a server.

When the computer executable instruction stored in the storage medium is executed by the processor and the target operation is a writing operation, the writing rule further includes command data to be written to the peripheral device, and the processes may further include writing the command data included in the writing rule to an attribute value of the target characteristic corresponding to the writing operation.

When the computer executable instruction stored in the storage medium is executed by the processor and the target operation is a monitoring operation, the processes may further include: monitoring an attribute value of the target characteristic corresponding to the monitoring operation; and returning corresponding response data to the primary device if the attribute value of the target characteristic corresponding to the monitoring operation changes.

When the computer executable instruction stored in the storage medium is executed by the processor, the monitoring rule further includes a response data collection field and a response data count field, and the processes may further include: collecting response data corresponding to the target operation through the response data collection field, the response data including operation success data or operation failure data; and counting the response data corresponding to the target operation through the response data count field.

When the computer executable instruction stored in the storage medium is executed by the processor, the processes may further include obtaining a second BLE model based on the response data corresponding to the target operation after the target operation ends.

When the computer executable instruction stored in the storage medium is executed by the processor, the processes may further include: determining whether the second BLE model includes one of the scanning rule, the reading rule, the writing rule, or the monitoring rule; and disconnecting the communication connection between the peripheral device and the primary device if none of the rules is included.

When the computer executable instruction stored in the storage medium is executed by the processor, obtaining a first BLE universal model corresponding to a target device includes obtaining the first BLE universal model corresponding to the target device from a Cloud.

The computer-readable storage medium provided by the embodiment of the specification can implement the processes in the foregoing method embodiments, and achieve the same functions and effects of the forgoing method embodiments, which is not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technologies, improvements of many method procedures can be considered as direct improvements of hardware circuit structures. Designers mostly program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by programming the device by a user. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and coding. The original code is written in a specific programming language before compiling, and this language is referred to as a hardware description language (HDL). There are various kinds of HDLs, for example, advanced Boolean expression language (ABEL), altera hardware description language (AHDL), Confluence, Cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller, and an embedded microcontroller. Examples of the controller include, but are not limited to, the following microcontrollers: ARC 625D, Atmel AT91SAM, Microchip PIC18F26K20, and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller, and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of the specification, the functions of the units may be implemented in a same piece of or multiple pieces of software and/or hardware.

A person skilled in the art should understand that the embodiments of the specification may be provided as a method, a system, or a computer program product. Therefore, the specification may use a form of a hardware-only embodiment, a software-only embodiment, or an embodiment combining software and hardware. In addition, the specification may use a form of a computer program product implemented on one or more computer available storage media (including but not limited to a disk memory, a CD-ROM, an optical memory, and the like) including computer available program code.

The specification is described with reference to flowcharts and/or block diagrams of the method, the device (system), and the computer program product in the embodiments of the specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, wherein the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processes implemented by a computer, and instructions executed on the computer or another programmable data processing device provide steps for implementing functions specified in one or more procedures in the flowcharts and/or one or more blocks in the block diagrams.

In a typical configuration, the computing device includes one or more processors (CPUs), an input/output interface, a network interface, and a memory.

The memory may include, among computer readable media, a non-persistent memory, and a random access memory (RAM) and/or a non-volatile memory, such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program, or other data. Examples of computer storage media include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise", and any other variants covers non-exclusive inclusion. Thereby, the process, method, article, or device which includes a series of elements not only includes those elements, but also includes other elements which are not explicitly listed, or include the inherent elements of the process, method, article and device. Without further limitation, the element defined by a phrase "include one" does not exclude other same elements in the process, method, article, or device which includes the element.

A person skilled in the art should understand that the embodiments of the specification may be provided as a method, a system, or a computer program product. Therefore, the specification may use a form of hardware only embodiments, software only embodiments, or embodiments with a combination of software and hardware. In addition, the specification may use a form of a computer program product implemented on one or more computer available storage media (including but not limited to a disk memory, a CD-ROM, an optical memory, and the like) including computer available program code.

The specification can be described in the general context of computer executable instructions executed by a computer, for example, a program module. Generally, the program module includes a routine, a program, an object, a component, a data structure, and the like for executing a particular task or implementing a particular abstract data type. The specification can also be practiced in a distributed computing environment in which tasks are performed by remote processing devices that are connected through a communication network. In a distributed computing environment, the program module may be located in both local and remote computer storage media including storage devices.

The embodiments of the specification are all described in a progressive manner. Same or similar parts in different embodiments can be referred to each other. Description of each embodiment focuses on its difference from other embodiments. Especially, a system embodiment is basically similar to a method embodiment, and therefore is described briefly, such that the relevant parts may be referred to corresponding descriptions in the method embodiment.

The foregoing descriptions are merely embodiments of the specification and are not intended to limit the specification. For a person skilled in the art, various modifications and variations can be made to the specification. Any modification, equivalent replacement, or improvement made without departing from the spirit and principle of the specification shall fall within the scope of the claims of the specification.

What is claimed is:

1. A wireless communications method, applied to a primary device, the method comprising:
    obtaining a first wireless universal model corresponding to a target device, wherein the first wireless universal model comprises a scanning rule and one or more of a reading rule, a writing rule, or a monitoring rule applicable to wireless devices, the scanning rule comprises identification information of the target device, and the reading rule, the writing rule, or the monitoring rule comprises a characteristic identifier of at least one target characteristic corresponding to at least one target service and a service identifier of the at least one target service;
    scanning peripheral devices, and determining identification information of a scanned peripheral device based on the scanning rule;
    determining whether the identification information of the target device matches the identification information of the scanned peripheral device;
    in response to that the identification information of the target device matches the identification information of the scanned peripheral device, pairing the scanned peripheral device with the primary device, to establish a communication connection between the scanned peripheral device and the primary device;
    in response to that a target operation is performed on the scanned peripheral device, obtaining at least one service of the scanned peripheral device, wherein the target operation comprises one of a reading operation, a writing operation, or a monitoring operation;
    determining a service identifier of the obtained at least one service;
    determining whether the service identifier of the obtained at least one service is the same as the service identifier of the at least one target service;
    in response to that the service identifier of the obtained at least one service is the same as the service identifier of the at least one target service, determining that the obtained at least one service is the at least one target service corresponding to the target operation;
    determining a characteristic identifier of at least one characteristic corresponding to the obtained at least one service of the scanned peripheral device;
    determining whether the characteristic identifier of the at least one characteristic is the same as the characteristic identifier of the at least one target characteristic; and
    in response to that the characteristic identifier of the at least one characteristic is the same as the characteristic identifier of the at least one target characteristic, determining that the at least one characteristic is the at least one target characteristic corresponding to the at least one target service.

2. The communications method according to claim 1, wherein
    the target operation is a reading operation, and
    the communications method further comprises:

reading an attribute value of a target characteristic corresponding to the reading operation; and
uploading the read attribute value of the target characteristic corresponding to the reading operation to a server.

3. The communications method according to claim 1, wherein
the target operation is a writing operation,
the writing rule comprises command data to be written to the scanned peripheral device, and
the communications method further comprises writing the command data comprised in the writing rule to an attribute value of a target characteristic corresponding to the writing operation.

4. The communications method according to claim 1, wherein
the target operation is a monitoring operation,
the monitoring rule comprises a response data collection field and a response data count field, and
the communications method further comprises:
monitoring an attribute value of a target characteristic corresponding to the monitoring operation;
in response to that the attribute value of the target characteristic corresponding to the monitoring operation changes, returning response data corresponding to the target operation to the primary device;
collecting the response data corresponding to the target operation through the response data collection field, wherein the response data corresponding to the target operation comprises operation success data or operation failure data; and
counting pieces of the response data corresponding to the target operation through the response data count field.

5. The communications method according to claim 4, further comprising:
obtaining a second wireless model based on the response data corresponding to the target operation after the target operation ends;
determining whether the second wireless model comprises one of the scanning rule, the reading rule, the writing rule, or the monitoring rule; and
in response to that the second wireless model does not comprise one of the scanning rule, the reading rule, the writing rule, or the monitoring rule, disconnecting the communication connection between the scanned peripheral device and the primary device.

6. A wireless communications device, comprising a processor and a memory configured to store computer executable instructions, the computer executable instructions, when executed, causing the processor to perform operations including:
obtaining a first wireless universal model corresponding to a target device, wherein the first wireless universal model comprises a scanning rule and one or more of a reading rule, a writing rule, or a monitoring rule applicable to wireless devices, the scanning rule comprises identification information of the target device, and the reading rule, the writing rule, or the monitoring rule comprises a characteristic identifier of at least one target characteristic corresponding to at least one target service and a service identifier of the at least one target service;
scanning peripheral devices, and determining identification information of a scanned peripheral device based on the scanning rule;
determining whether the identification information of the target device matches the identification information of the scanned peripheral device;
in response to that the identification information of the target device matches the identification information of the scanned peripheral device, pairing the scanned peripheral device with the primary device, to establish a communication connection between the scanned peripheral device and the primary device;
in response to that a target operation is performed on the scanned peripheral device, obtaining at least one service of the scanned peripheral device, wherein the target operation comprises one of a reading operation, a writing operation, or a monitoring operation;
determining a service identifier of the obtained at least one service;
determining whether the service identifier of the obtained at least one service is the same as the service identifier of the at least one target service;
in response to that the service identifier of the obtained at least one service is the same as the service identifier of the at least one target service, determining that the obtained at least one service is the at least one target service corresponding to the target operation;
determining a characteristic identifier of at least one characteristic corresponding to the obtained at least one service of the scanned peripheral device;
determining whether the characteristic identifier of the at least one characteristic is the same as the characteristic identifier of the at least one target characteristic; and
in response to that the characteristic identifier of the at least one characteristic is the same as the characteristic identifier of the at least one target characteristic, determining that the at least one characteristic is the at least one target characteristic corresponding to the at least one target service.

7. The wireless communications device according to claim 6, wherein
the target operation is a reading operation, and
the operations further comprise:
reading an attribute value of a target characteristic corresponding to the reading operation; and
uploading the read attribute value of the target characteristic corresponding to the reading operation to a server.

8. The wireless communications device according to claim 6, wherein
the target operation is a writing operation,
the writing rule comprises command data to be written to the scanned peripheral device, and
the operations further comprise writing the command data comprised in the writing rule to an attribute value of a target characteristic corresponding to the writing operation.

9. The wireless communications device according to claim 6, wherein
the target operation is a monitoring operation,
the monitoring rule comprises a response data collection field and a response data count field, and
the operations further comprise:
monitoring an attribute value of a target characteristic corresponding to the monitoring operation;
in response to that the attribute value of the target characteristic corresponding to the monitoring operation changes, returning response data corresponding to the target operation to the primary device;

collecting the response data corresponding to the target operation through the response data collection field, wherein the response data corresponding to the target operation comprises operation success data or operation failure data; and counting pieces of the response data corresponding to the target operation through the response data count field.

10. The wireless communications device according to claim 9, wherein the operations further comprise:

obtaining a second wireless model based on the response data corresponding to the target operation after the target operation ends;

determining whether the second wireless model comprises one of the scanning rule, the reading rule, the writing rule, or the monitoring rule; and in response to that the second wireless model does not comprise one of the scanning rule, the reading rule, the writing rule, or the monitoring rule, disconnecting the communication connection between the scanned peripheral device and the primary device.

11. A non-transitory computer-readable storage medium, configured to store computer executable instructions, when executed by a processor, the computer executable instructions to cause the processor to perform operations including:

obtaining a first wireless universal model corresponding to a target device, wherein the first wireless universal model comprises a scanning rule and one or more of a reading rule, a writing rule, or a monitoring rule applicable to wireless devices, the scanning rule comprises identification information of the target device, and the reading rule, the writing rule, or the monitoring rule comprises a characteristic identifier of at least one target characteristic corresponding to at least one target service and a service identifier of the at least one target service;

scanning peripheral devices, and determining identification information of a scanned peripheral device based on the scanning rule;

determining whether the identification information of the target device matches the identification information of the scanned peripheral device;

in response to that the identification information of the target device matches the identification information of the scanned peripheral device, pairing the scanned peripheral device and the primary device, to establish a communication connection between the scanned peripheral device and the primary device;

in response to that a target operation is performed on the scanned peripheral device, obtaining at least one service of the scanned peripheral device, wherein the target operation comprises one of a reading operation, a writing operation, or a monitoring operation;

determining a service identifier of the obtained at least one service;

determining whether the service identifier of the obtained at least one service is the same as the service identifier of the at least one target service;

in response to that the service identifier of the obtained at least one service is the same as the service identifier of the at least one target service, determining that the obtained at least one service is the at least one target service corresponding to the target operation;

determining a characteristic identifier of at least one characteristic corresponding to the obtained at least one service of the scanned peripheral device;

determining whether the characteristic identifier of the at least one characteristic is the same as the characteristic identifier of the at least one target characteristic; and in response to that the characteristic identifier of the at least one characteristic is the same as the characteristic identifier of the at least one target characteristic, determining that the at least one characteristic is the at least one target characteristic corresponding to the at least one target service.

12. The non-transitory computer-readable storage medium according to claim 11, wherein the operations further comprise:

in response to that an attribute value of a target characteristic corresponding to the monitoring operation changes, obtaining a second wireless model based on response data corresponding to the target operation after the target operation ends, wherein the response data corresponding to the target operation is returned to the primary device;

determining whether the second wireless model comprises one of the scanning rule, the reading rule, the writing rule, or the monitoring rule; and in response to that the second wireless model does not comprise one of the scanning rule, the reading rule, the writing rule, or the monitoring rule, disconnecting the communication connection between the scanned peripheral device and the primary device.

* * * * *